United States Patent
Hamaguchi et al.

(10) Patent No.: US 12,444,948 B2
(45) Date of Patent: Oct. 14, 2025

(54) DEMAND AND SUPPLY PLANNING METHOD AND DEMAND AND SUPPLY PLANNING APPARATUS

(71) Applicant: IHI Corporation, Koto-ku (JP)

(72) Inventors: Kenichi Hamaguchi, Koto-ku (JP); Akinobu Inamura, Koto-ku (JP); Yuji Koguma, Koto-ku (JP); Sho Kazikura, Koto-ku (JP); Daiki Kojima, Koto-ku (JP)

(73) Assignee: IHI Corporation, Koto-ku (JP)

( * ) Notice: Subject to any disclaimer, the term of this patent is extended or adjusted under 35 U.S.C. 154(b) by 205 days.

(21) Appl. No.: 17/997,894

(22) PCT Filed: Jul. 8, 2021

(86) PCT No.: PCT/JP2021/025845
§ 371 (c)(1),
(2) Date: Nov. 3, 2022

(87) PCT Pub. No.: WO2022/038920
PCT Pub. Date: Feb. 24, 2022

(65) Prior Publication Data
US 2023/0170700 A1    Jun. 1, 2023

(30) Foreign Application Priority Data

Aug. 20, 2020  (JP) ................................ 2020-139492

(51) Int. Cl.
*H02J 3/32* (2006.01)
*H02J 3/46* (2006.01)
(52) U.S. Cl.
CPC . *H02J 3/32* (2013.01); *H02J 3/46* (2013.01)
(58) Field of Classification Search
CPC .. H02J 3/32; H02J 3/46; H02J 2203/20; H02J 2300/10; H02J 3/003; H02J 3/004;
(Continued)

(56) References Cited

U.S. PATENT DOCUMENTS

| 11,022,947 B2* | 6/2021 | ElBsat | H02J 3/003 |
| 2015/0039145 A1* | 2/2015 | Yang | G05B 13/02 |
| | | | 700/291 |
| 2020/0006944 A1* | 1/2020 | Fife | H02J 3/004 |

FOREIGN PATENT DOCUMENTS

| JP | 2009-273359 A | 11/2009 |
| JP | 2014-82932 A | 5/2014 |

(Continued)

OTHER PUBLICATIONS

International Search Report mailed on Sep. 21, 2021 in PCT/JP2021/025845 filed on Jul. 8, 2021 (2 pages).

*Primary Examiner* — Mohammad Ali
*Assistant Examiner* — Dhruvkumar Patel
(74) *Attorney, Agent, or Firm* — Oblon, McClelland, Maier & Neustadt, L.L.P.

(57) ABSTRACT

A demand and supply planning method generates a supply-demand plan including information that specifies operation of an energy generation unit for each unit time in a microgrid having energy generation units being connected to an external energy supply system and generating energy while consuming fuel, an energy storage unit, and a load unit; by calculating an optimization problem related to an objective function including terms related to energy transfer from the external energy supply system in the microgrid and terms related to fuel consumption in the microgrid by using a constraint condition related to a relationship between information related to an operating duration time in each of the one or more energy generation units at a start time for generating the supply-demand plan and a minimum operation time constraint of the energy generation unit; and outputting the supply-demand plan based on a calculation result of the optimization problem.

12 Claims, 8 Drawing Sheets

(58) Field of Classification Search
CPC ...... H02J 3/381; H02J 3/00; H02J 3/38; H02J 13/00; Y02E 40/70; Y02E 60/00; Y02E 70/30; Y04S 10/123; Y04S 10/14
See application file for complete search history.

(56) References Cited

FOREIGN PATENT DOCUMENTS

| | | | |
|---|---|---|---|
| JP | 2017-5880 A | | 1/2017 |
| JP | 2017005880 A | * | 1/2017 |
| JP | 2017-145325 A | | 8/2017 |

* cited by examiner

Fig.6

RECOMMENDATION NOTIFICATION

IF CURRENT OPERATING IS CHANGED AS FOLLOWS,
IMPROVEMENT EFFECT OF X YEN/hour CAN BE EXPECTED.

CURRENT VALUE (Y YEN/hour)

| NAME OF UNIT | STATE | GENERATED POWER | STEAM FLOW RATE |
|---|---|---|---|
| RECEIVED POWER | - | 4500 kW | - |
| STORAGE BATTERY 1 | START | 5500 kW | - |
| STORAGE BATTERY 2 | STOP | 0 kW | - |
| COGENERATION | STOP | 0 kW | 0 ton/h |
| BOILER | START | - | 7 ton/h |
| TOTAL VALUE | | 10000 kW | 7 ton/h |

PROPOSED VALUE (Z YEN/hour)

| NAME OF UNIT | STATE | GENERATED POWER | STEAM FLOW RATE |
|---|---|---|---|
| RECEIVED POWER | - | 3000 kW | - |
| STORAGE BATTERY 1 | STOP | 0 kW | - |
| STORAGE BATTERY 2 | STOP | 0 kW | - |
| COGENERATION | START | 7000 kW | 7 ton/h |
| BOILER | STOP | - | 0 ton/h |
| TOTAL VALUE | | 10000 kW | 7 ton/h |

OK

DEMAND AND SUPPLY PLANNING METHOD AND DEMAND AND SUPPLY PLANNING APPARATUS

TECHNICAL FIELD

This disclosure relates to a demand and supply planning method and a demand and supply planning apparatus.

BACKGROUND ART

In a power system having a power generation device and a storage battery, a method of calculating a minimization problem by using economic indexes such as a cost as an objective function is used at the time of generating a supply-demand plan related to the operating of the power generation device and the operation of the storage battery. Further, as constraint conditions for the objective function, a minimum operating duration time and a minimum stop duration time of the generator are taken into consideration. In Patent Literatures 1 and 2, the minimum operating duration time and the minimum stop duration time are described in linear formulas.

CITATION LIST

Patent Literature

Patent Literature 1: Japanese Unexamined Patent Publication No. 2014-082932
Patent Literature 2: Japanese Unexamined Patent Publication No. 2017-145325

SUMMARY OF INVENTION

Technical Problem

In recent years, since it has been required to generate a supply-demand plan more frequently in order to perform more economical operations, there has been considered that the start time when generating the supply-demand plan is set to be closer to the current time. However, with respect to objective functions and constraint conditions defined by methods described in Patent Literatures 1 and 2, when the start time of the supply-demand plan is the current time or close to the current time, there is a possibility that a solution satisfying a minimum operating duration time and a minimum stop duration time of a generator to be considered cannot be obtained.

This disclosure has been made in view of the above, and an object is to provides a demand and supply planning method and a demand and supply planning apparatus capable of generating a supply-demand plan as appropriate regardless of a relationship between a start time and a current time of the supply-demand plan.

Solution to Problem

A demand and supply planning method according to one embodiment of the present disclosure generates a supply-demand plan including information that specifies operation of the energy generation unit for each unit time in a microgrid having one or more energy generation units being connected to an external energy supply system and generating energy while consuming fuel, an energy storage unit storing the energy, and a load unit consuming the energy, the demand and supply planning method including: calculating an optimization problem related to an objective function including terms related to energy transfer from the external energy supply system in the microgrid and terms related to fuel consumption in the microgrid by using a constraint condition related to a relationship between information related to an operating duration time in each of the one or more energy generation units at a start time for generating the supply-demand plan and a minimum operation time constraint of the energy generation unit; and outputting the supply-demand plan based on a calculation result of the optimization problem.

Advantageous Effects of Invention

According to the present disclosure, a demand and supply planning method and a demand and supply planning apparatus capable of appropriately generating a supply-demand plan regardless of a relationship between a start time and a current time of the supply-demand plan are provided.

BRIEF DESCRIPTION OF DRAWINGS

FIG. 6 illustrates an example of a recommendation notification by an output unit of the energy management system.

DESCRIPTION OF EMBODIMENTS

Figure 1:
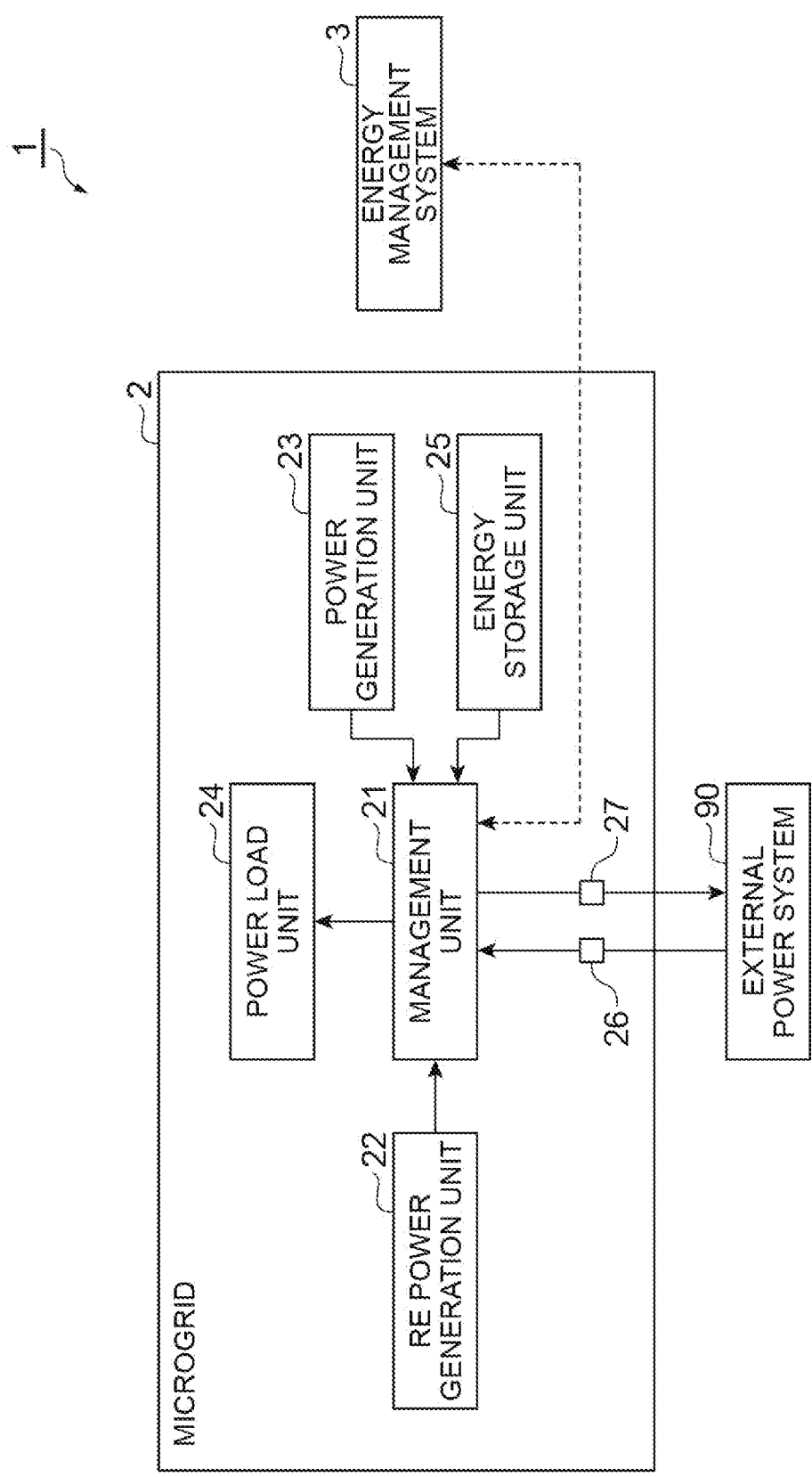
FIG. 1 is a schematic diagram of a power supply system according to an embodiment.

A demand and supply planning method according to one embodiment of the present disclosure generates a supply-demand plan including information that specifies operation of the energy generation unit for each unit time in a microgrid having one or more energy generation units being connected to an external energy supply system and generating energy while consuming fuel, an energy storage unit storing the energy, and a load unit consuming the energy, the demand and supply planning method including: calculating an optimization problem related to an objective function including terms related to energy transfer from the external energy supply system in the microgrid and terms related to fuel consumption in the microgrid by using a constraint condition related to a relationship between information related to an operating duration time in each of the one or more energy generation units at a start time for generating the supply-demand plan and a minimum operation time constraint of the energy generation unit; and outputting the supply-demand plan based on a calculation result of the optimization problem.

According to the above-mentioned demand and supply planning method, the optimization problem for the objective function including terms related to energy transfer from external energy supply systems in the microgrid and terms related to fuel consumption in the microgrid is calculated by a constraint condition related to the relationship between information related to an operating duration time in each of one or more energy generation units at the start time for generating the supply-demand plan and a minimum operation time constraint of the energy generation unit. Then, the supply-demand plan is output based on this result. In this manner, by using the constraint condition related to the information related to the operating duration time in each of the one or more energy generation units at the start time for generating the supply-demand plan, the supply-demand plan can be generated as appropriate even when the start time is the current time or is close to the current time.

In some aspect, the above-described optimization problem can be reduced to a mixed integer linear programming problem.

As described above, when the optimization problem is reduced to a mixed integer linear programming problem, the time up to solving the optimization problem can be estimated to be short to some extent. For this reason, the process of generating the supply-demand plan can be repeatedly performed, and an appropriate supply-demand plan can be generated according to the situation of the microgrid.

in some aspect, the start time for generating the supply-demand plan may be the current time or may be set to a time period when the unit time elapses once from the current time.

As described above, when the start time for generating the supply-demand plan is set to be close to the current time, there is a need to calculate the optimization problem considering the operating duration time of the energy generation unit up to now. On the other hand, when the start time is the current time or is set to a time period when the unit time elapses once from the current time, by setting the constraint condition considering the operating duration time of each energy generator at the start time, the supply-demand plan can be generated as appropriate even when the start time is the current time or is close to the current time.

Further, in some aspect, evaluating of the calculation result of the optimization problem may be further included, and outputting of the supply-demand plan can be an embodiment in which the output content is changed based on the result of the evaluation.

By evaluating the calculation result of the optimization problem as described above and changing the output content based on the result, for example, when the supply-demand plan based on the calculation result is effective in improving the cost in the microgrid, the purport can be presented to the user, and on the other hand, even when the supply-demand plan based on the calculation result is not sufficiently effective in improving the cost in the microgrid, the purport can be presented to the user. And, more detailed information according to the calculation result can be output.

In some aspect, the evaluating is evaluating a difference between a cost due to an operating state in the microgrid in a state where the calculation result of the optimization problem is not applied and a cost when the calculation result of the optimization problem is applied to the microgrid, and in the outputting of the supply-demand plan, the information related to the cost that can be reduced when the calculation result of the optimization problem is applied to the microgrid when the difference is larger than the threshold value is output.

As described above, a difference between a cost due to the operating state in the microgrid in a state where the calculation result of the optimization problem is not applied and a cost when the calculation result of the optimization problem is applied to the microgrid is evaluated, and in a configuration of outputting information related to cost when the result is larger than the threshold value, since the more specific information can be presented to the user, the user can flexibly respond to the adoption or rejection of the generated supply-demand plan.

In some aspect, the acquiring of information related to the operating duration time of the one or more energy generation units up to the current time is further included, and in the calculating, the constraint condition based on the acquired information related to the operating duration time of the one or more energy generation units is used.

As described above, with configuration of acquiring information related to the operating duration time of one or more energy generation units and calculating the optimization problem by using the constraint conditions based on the acquired information, since the calculations using the actual operating duration time up to the current time of the energy generation unit can be performed, a more appropriate supply-demand plan can be generated based on actual results.

The demand and supply planning apparatus according to one embodiment of the present disclosure generates a supply-demand plan including information that specifies operation of the energy generation unit for each unit time in a microgrid having one or more energy generation units being connected to an external energy supply system and generating energy while consuming fuel, an energy storage unit storing the energy, and a load unit consuming the energy, the demand and supply planning apparatus including: a calculation unit calculating an optimization problem related to an objective function including terms related to energy transfer from the external energy supply system in the microgrid and terms related to fuel consumption in the microgrid by using a constraint condition related to a relationship between information related to an operating duration time in each of the one or more energy generation units at a start time for generating the supply-demand plan and a minimum operation time constraint of the energy generation unit; and an output unit outputting the supply-demand plan based on a calculation result of the optimization problem.

According to the above-mentioned demand and supply planning apparatus, the optimization problem for the objective function including terms related to energy transfer from the external energy supply system in the microgrid and terms related to fuel consumption in the microgrid is calculated by using the constraint condition related to the relationship between the information related to the operating duration time in each of the one or more energy generation units at the start time for generating the supply-demand plan and the minimum operation time constraint of the energy generation unit. Then, the supply-demand plan is output based on this result. In this manner, by using the constraint condition related to the information related to the operating duration time in each of the one or more energy generation units at the start time for generating the supply-demand plan, the supply-demand plan can be generated as appropriate even when the start time is the current time or is close to the current time.

Hereinafter, a mode for carrying out the present disclosure will be described in detail with reference to the accompanying drawings. It is noted that, in the description of the drawings, the same elements are denoted by the same reference numerals, and duplicate description will be omitted.

[Power Supply System]

Figure 2:
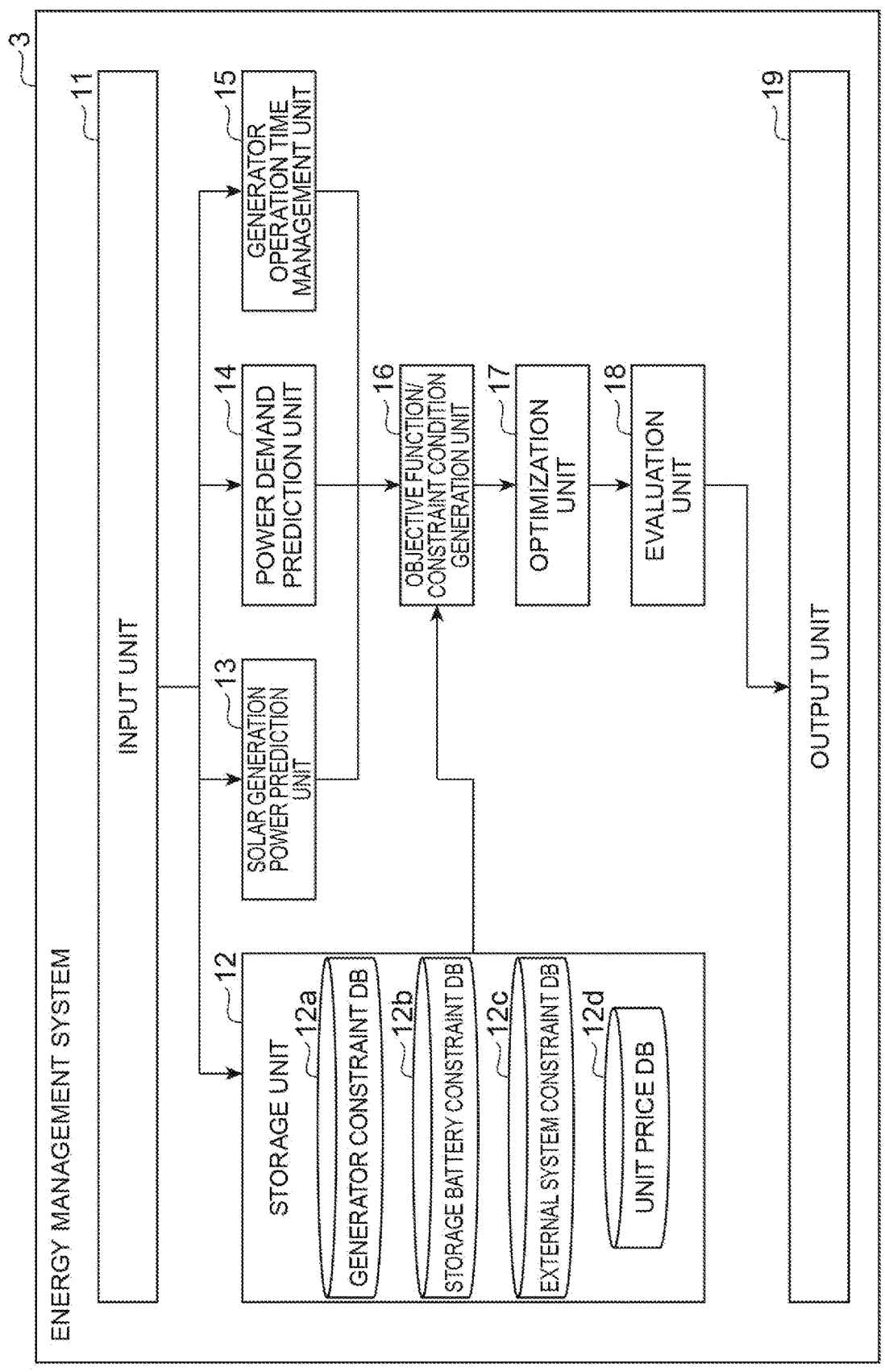
FIG. 2 is a schematic diagram illustrating functions of an energy management system included in the power supply system.

First, a schematic configuration of a power supply system 1 will be described with reference to FIGS. 1 and 2. FIG. 1 is a schematic diagram of the power supply system of the embodiment. Further, FIG. 2 is a schematic diagram illustrating a function of an energy management system included in the power supply system. The power supply system 1 includes a microgrid 2 and an energy management system 3 (demand and supply planning apparatus). Hereinafter, the "energy management system" is referred to as an "EMS". The microgrid 2 includes a management unit 21, an RE power generation unit 22, a power generation unit 23, a power load unit 24, an energy storage unit 25, a received power measuring unit 26, and a power transmission power measuring unit 27. In the microgrid 2, the power load unit 24 basically consumes the power output by the RE power generation unit 22 and the power generation unit 23.

The microgrid 2 is connected to an external power system 90 (external energy supply system). The microgrid 2 can receive insufficient power from the external power system 90. That is, a portion of the power required in the microgrid 2 can be supplied from the external power system 90. The power supplied from the external power system 90 is measured by the received power measuring unit 26.

Further, the microgrid 2 can supply surplus power to the external power system 90. That is, a portion of the power output by the RE power generation unit 22 and the power generation unit 23 of the microgrid 2 can be outflowed to the external power system 90. The power supplied to the external power system 90 is measured by the power transmission power measuring unit 27.

However, in some cases, the outflow (so-called a reverse power flow) of power from the microgrid 2 to the external power system 90 may be limited by a contract with an administrator of the external power system 90. For example, the reverse power flow is prohibited due to insufficient empty capacity of a high-voltage distribution system in the external power system 90. For this reason, in this embodiment, the case where the management unit 21 does not basically the reverse power flow will be described. That is, in the microgrid 2, all the generated power is consumed or stored in the power load unit 24 and the energy storage unit 25.

The management unit 21 is connected to the external power system 90. The management unit 21 manages a flow of power with respect to the external power system 90, the RE power generation unit 22, the power generation unit 23, the power load unit 24, and the energy storage unit 25. The management unit 21 controls, for example, the RE power generation unit 22 and the energy storage unit 25 according to the output from an EMS 3.

In this embodiment, the management unit 21 is configured so that an operation mode of the microgrid 2 can be flexibly changed. The management unit 21 is configured so that the reverse power flow to the external power system 90 can be generated. For this reason, the management unit 21 can exceptionally generate the reverse power flow by changing the operation mode of the microgrid 2. For example, a portion of the power generated in the microgrid 2 may be reverse-power-flowed to the external power system 90.

The RE power generation unit 22 generates power by using renewable energy. In this embodiment, the RE power generation unit 22 includes a solar power generation facility as an example. The RE power generation unit 22 may include the power generation facility by using other renewable energy such as a wind power generation facility.

The RE power generation unit 22 supplies the generated power to the power load unit 24 and the energy storage unit 25 in response to a control command from the management unit 21. It is noted that, a generated power amount of the RE power generation unit 22 may fluctuate depending on the external environment such as a weather.

The power generation unit 23 (energy generation unit) performs power generation by other methods different from that of renewable energy. In this embodiment, the power generation unit 23 includes the power generation facility (generator) that generates power by using a fuel of a gas turbine, a gas engine, and the like. That is, the power generation unit 23 consumes the fuel to generate the power. However, the power generation unit 23 is not limited to the above-described configuration. Further, a plurality of the power generation units 23 may be provided, and each power generation unit may operate independently. For example, each of the plurality of generators may operate independently as the power generation unit 23.

The power generation unit 23 supplies the generated power to the power load unit 24 and the energy storage unit 25 in response to the control command from the management unit 21. For example, the power generation unit 23 adjusts the generated power amount in response to the control command from the management unit 21.

The power load unit 24 (load unit) consumes the power. The power load unit 24 is, for example, the power consumer and uses the received power for the desired purpose.

The energy storage unit 25 stores and releases the power in the microgrid 2. In this embodiment, the energy storage unit 25 is, for example, a stationary storage battery. The energy storage unit 25 is, for example, a lithium ion battery (LiB). The energy storage unit 25 may be another secondary battery such as a lead storage battery or may be another type of energy storage device such as a flywheel battery. Further, the energy storage unit 25 may be configured by combining the above-mentioned battery, energy storage device, and the like. Hereinafter, in this embodiment, the storage of power in the energy storage unit 25 is referred to as "charge", and the release of power in the energy storage unit 25 is referred to as "discharge". The energy storage unit 25 charges and discharges the power in the microgrid 2 in response to the control command from the management unit 21. The energy storage unit 25 adjusts a charged power amount to be charged per unit time or a discharged power amount to be discharged per unit time in response to the control command from the management unit 21.

The EMS 3 has a function of generating the power supply-demand plan for the microgrid 2. As illustrated in FIG. 2, the EMS 3 includes an input unit 11, a storage unit 12, a solar generation power prediction unit 13, a power demand prediction unit 14, a generator operation time management unit 15, an objective function/constraint condition generation unit 16, an optimization unit 17, an evaluation unit 18, and an output unit 19. Among these components, the objective function/constraint condition generation unit 16 and the optimization unit 17 function as a calculation unit for generating and calculating an optimization problem related to the supply-demand plan. It is noted that, in this embodiment, a case where the optimization problem is reduced to a mixed integer linear programming problem will be described.

Figure 3:
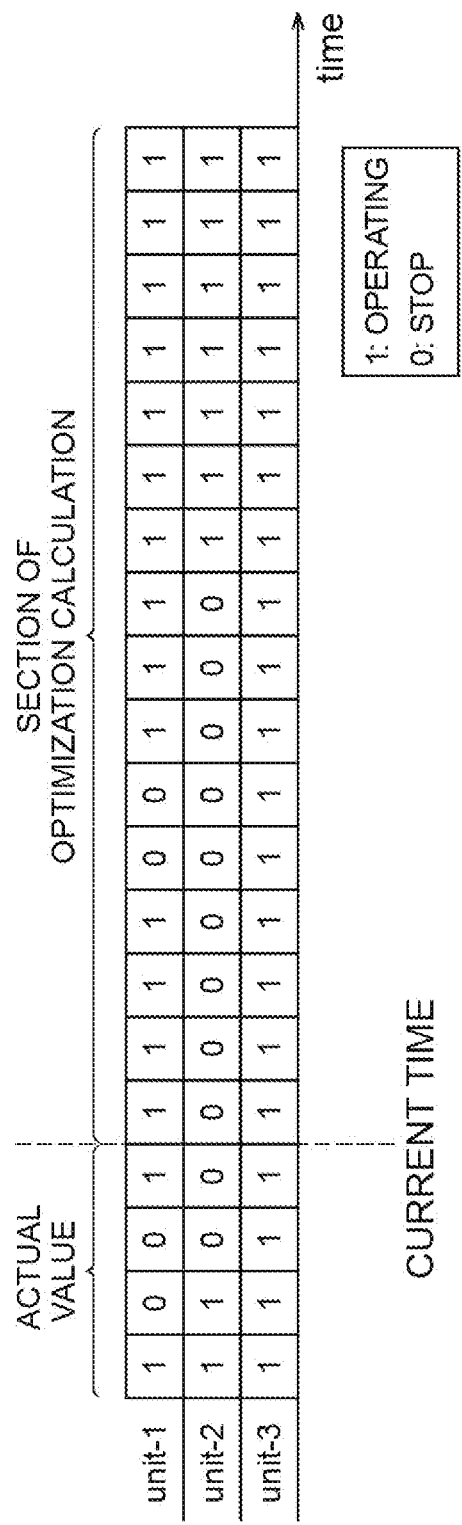
FIG. 3 is a diagram illustrating an example of an operation plan of a generator included in a supply-demand plan.

The supply-demand plan generated by the EMS 3 is a plan for specifying the operation of the power generation unit 23 and the energy storage unit 25 according to the demand for power in the microgrid 2. Therefore, the supply-demand plan includes information specifying the operation of the power generation unit 23 and the energy storage unit 25. Among the supply-demand plans, a specific example of the plan related to the operation (operating or stop) related to the power generation unit 23 will be described with reference to FIG. 3. In FIG. 3, three generators (unit-1 to unit-3) as three power generation units 23 are illustrated. Further, it is assumed that these generators (power generation units 23) can operate independently. As illustrated in FIG. 3, each generator operates by switching between operating and stop every unit time even in a time period before the current time. In the supply-demand plan generated by the EMS 3, the plan related to the operation of the power generation unit 23 is obtained by dividing the future time into unit times and defining the operating (1) or stop (0) of the generator in each unit time. In the example illustrated in FIG. 3, the operation of each generator is in a state of being specified as operating (1) or stop (0) for a plurality of future unit times (16 unit times in FIG. 3) after the current time by setting the current time as a start point for generating the plan related to the operation. Although not illustrated in FIG. 3, in the supply-demand plan, the received power/transmitted power in the microgrid 2 and the generated power in the power generation unit 23 at each time are defined. Further, in the supply-demand plan, with respect to the operation of the energy storage unit 25, charge/discharge for each unit time may be defined similarly to the plan related to the operation of the power generation unit 23. It is noted that, in the following embodiments, in some cases, the "unit time" may be referred to as a "step".

The EMS 3 generates and optimizes the supply-demand plan including a plan related to the operation of the power generation unit 23, and outputs the optimized supply-demand plan. For example, the EMS 3 presents the optimized supply-demand plan to the user. For example, the EMS 3 outputs the optimized supply-demand plan to the management unit 21. The management unit 21 controls the power generation unit 23 and the energy storage unit 25 based on the supply-demand plan output from the EMS 3. Further, the management unit 21 may control the power generation unit 23 based on the supply-demand plan output from the EMS 3. The management unit 21 controls the power generation unit 23 and the energy storage unit 25 according to various situations of the RE power generation unit 22 or the like based on, for example, the supply-demand plan output from the EMS 3. For example, the management unit 21 may adjust the charge/discharge of the energy storage unit 25 according to the change in the generated power amount of the RE power generation unit 22 so that an electric power amount in the microgrid 2 is smoothed. As described above, in some cases, the management unit 21 may not strictly follow the supply-demand plan output from the EMS 3.

In the following embodiment, when generating the supply-demand plan by the EMS 3, the configuration for appropriately generating the supply-demand plan will be described even when the latest time close to the current time is set as the start time for generating the supply-demand plan.

[Energy Management System]

Returning to FIG. 2, each component constituting the EMS 3 will be described. The input unit 11 of the EMS 3 acquires information used for generating the supply-demand plan in the EMS 3 from the external device including the microgrid 2. The input unit 11 communicates with the external device and acquires information used in the EMS 3. The information acquired by the input unit 11 is transmitted to the storage unit 12, the solar generation power prediction unit 13, the power demand prediction unit 14, the generator operation time management unit 15, and the objective function/constraint condition generation unit 16 according to the type of information.

The storage unit 12 has a function of storing various information used in the EMS 3. Depending on the type of information retained in the storage unit 12, the storage unit 12 includes a generator constraint DB 12a, a storage battery constraint DB 12b, an external system constraint DB 12c, and a unit price DB 12d. The information retained in these DBs constituting the storage unit 12 is information that can be a constraint condition when planning the operation of the microgrid 2 including the power generation facility in the EMS 3.

The generator constraint DB 12a has a function of retaining the constraint conditions related to the operation of the power generation facility (generator or the like) constituting the power generation unit 23. The constraint condition related to the operation of the power generation facility include a maximum generated power and a minimum generated power by the power generation facility, parameters (operation characteristics of the power generation facility) indicating characteristics of the fuel and the generated power amount in the power generation facility, and a minimum operating duration time and a minimum stop duration time of the power generation facility, and the like. The constraint condition related to the operation of the power generation facility may be generated and stored by, for example, a designer of the EMS 3. Further, the constraint condition may be updated by a user (operator) of the EMS 3 or the like.

It is noted that, in some cases, in the following embodiment, various states of various facilities such as power generation facility may be collectively referred to as an "operation". For example, in some cases, both "operating" and "stop" in the power generation facility or the like may be referred to as an "operation". In addition, in some cases, the minimum operating duration time and the minimum stop duration time of the power generation facility may be collectively referred to as a "minimum operating duration time of the power generation facility".

The storage battery constraint DB 12b has a function of retaining constraint conditions related to the operation of the storage battery constituting the energy storage unit 25. The constraint condition related to the operation of the storage battery include the maximum charge power and the maximum discharge power of the storage battery, the upper limit value and the lower limit value of a remaining charge amount of the storage battery, and the like. The constraint condition related to the operation of the storage battery can be generated and stored by, for example, the designer of the EMS 3. Further, in some cases, the constraint condition may be updated by the user of the EMS 3 or the like.

An external system constraint DB 12c has a function to retain the constraint condition related to the power transmission and reception with respect to the external power system 90. The constraint condition related to power transmission and reception include, for example, upper and lower limits of received power and the like. The constraint condition related to power transmission and reception may be generated and stored by, for example, the designer of the EMS 3. Further, the constraint condition may be updated by the user of the EMS 3 or the like.

The unit price DB 12d has a function of retaining information related to a unit price of a cost to be considered when generating the plan in EMS 3, that is, the cost related to the operation of the microgrid 2. The information related to the unit price of the cost related to the operation of the microgrid 2 include, for example, the information related to the unit price of the fuel used in the power generation unit 23, the cost related to the power purchasing of the power supplied from the external power system 90, and the like. In some configuration, when the power purchasing from the external power system 90 through Japan Electric Power Exchange (JEPX) or the like is performed, the unit price DB 12*d* communicates with the external system via the Internet or the like to retain the unit price in the section in which the unit price DB 12*d* is a target of generation of the supply-demand plan.

The solar generation power prediction unit 13 has a function of predicting the power generated by the RE power generation unit 22 when the RE power generation unit 22 is the solar power generation facility. In solar power generation, the generated power mainly depends on the weather such as an amount of solar radiation. Therefore, the solar generation power prediction unit 13 acquires, for example, weather forecast data including the amount of solar radiation and the temperature from the outside via the Internet or the like and predicts the future solar generated power amount from the weather forecast data. It is noted that the method of predicting the generated power in the solar generation power prediction unit 13 is not limited to the above-mentioned prediction method, and for example, the future generated power amount may be predicted based on an actual value of a solar radiation meter installed in the microgrid 2 and an actual value of a generated power amount in the solar power generation facility. Further, the movement of clouds may be predicted from an omnidirectional camera in the microgrid 2 to predict the generated power amount in the solar power generation facility. It is noted that, instead of performing the detailed prediction in the solar generation power prediction unit 13, a configuration may be made in which the predicted value of the generated power amount in the solar power generation facility is received from the external system via the Internet or the like. In this manner, the solar generation power prediction unit 13 prepares a predicted value of the solar generated power amount by the solar power generation facility for the period for generating the supply-demand plan in the EMS 3.

The power demand prediction unit 14 has a function of predicting the demand for power used in the power load unit 24 of the microgrid 2. More specifically, the predicted value of the power consumption of the power load unit 24 in the microgrid 2 at the future time of the period for generating the supply-demand plan is output. As a method for predicting the power consumption, for example, a statistical method based on past power usage records in the power load unit 24 can be used. It is noted that, in a certain configuration, instead of performing detailed predictions in the power demand prediction unit 14, the power demand predicted value may be received from the external system via the Internet or the like. In this manner, the power demand prediction unit 14 prepares the predicted value of the power demand for the period for generating the supply-demand plan in the EMS 3.

The generator operation time management unit 15 has a function of managing the operating duration time of the generators constituting the power generation unit 23. The operating duration time of the generator is a count of what kind of operation (operating or stop) the generator has continued up to the current time. The generator operation time management unit 15 manages the operating duration time/stop duration time based on an operating state of the generator with the elapse of time. As an example of management of the operating duration time/stop duration time, for example, a certain threshold value $\gamma$ is introduced for the generated power amount of the generator. Then, the time period from the time when the generated power amount becomes the threshold value $\gamma$ or more to the current time is counted as an operating duration time. However, when the generated power amount is the threshold value $\gamma$ or less, the operating duration time is initialized to 0. Similarly, the stop duration time is also the time period from the time when the generated power amount becomes the threshold value $\gamma$ or less to the current time. However, when the generated power amount exceeds the threshold value $\gamma$, the stop duration time is initialized to 0.

Figure 4:
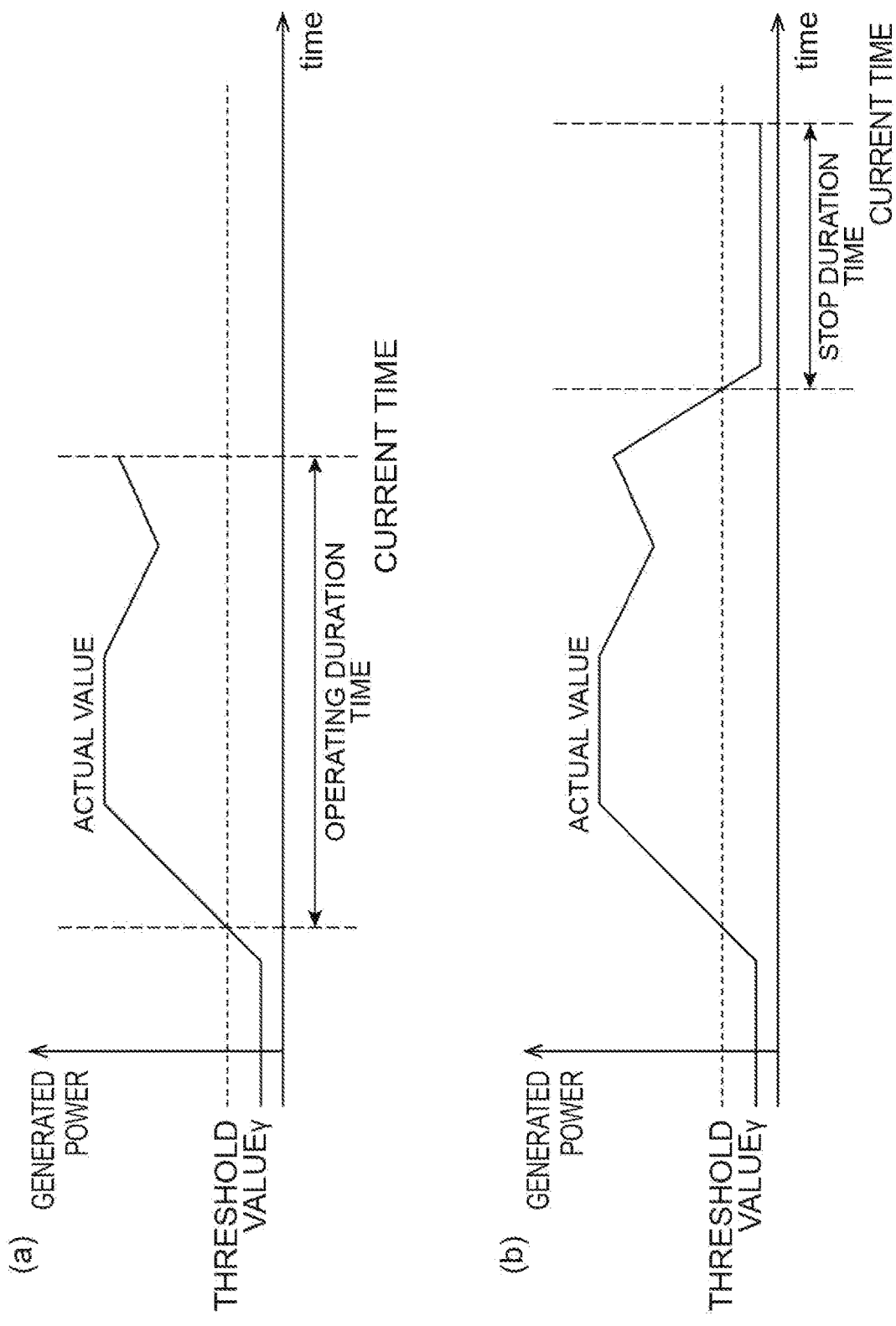
FIGS. 4($a$) and 4($b$) are diagrams illustrating a method of specifying an operating duration time and a stop duration time.

FIGS. 4(*a*) and 4(*b*) schematically illustrate a method of counting the operating duration time/stop duration time. FIG. 4(*a*) illustrates a state in which the operating in which the generated power becomes the threshold value $\gamma$ or more has been continued until now. At this time, a time period from the time when the threshold value becomes $\gamma$ or more to the current time becomes the operating duration time. On the other hand, FIG. 4(*b*) illustrates a state in which the operating stop duration time has been continued until now because the operating (or stop) in which the generated power becomes smaller than the threshold value $\gamma$ has continued until now. At this time, the time period from the time when the threshold value becomes less than $\gamma$ to the current time becomes the stop duration time. It is noted that the physical quantity for determining the operating/stop of the power generation unit 23 may be other than the generated power amount. For example, when the generator is a gas turbine, the operating/stop may be determined by using physical quantities such as a number of revolutions, an exhaust temperature of the gas turbine, and a temperature of a combustor unique to the generator. Further, the operating/stop of the power generation unit 23 is usually performed by sequence control of a control device of the power generation unit 23 (generator). Therefore, the operating duration time/stop duration time may be counted by using a start time and an end time of a specific sequence.

The objective function/constraint condition generation unit 16 has a function of generating the objective function and the constraint condition in order to generate the supply-demand plan including the operation of the power generation unit 23 (start and stop of the generator) described above. In some aspect, the process (generation of the objective function and the constraint condition) in the objective function/constraint condition generation unit 16 may be started at a regular time period (for example, every 3 minutes), or in some aspect, the process may be started with a specific event (for example, an instruction by the user of the EMS 3 pushing a button or the like down, reception of weather forecast data by the input unit 11, or the like) as a trigger. Further, these combinations may be used. The timing of starting the generation of the objective function and the constraint condition by the objective function/constraint condition generation unit 16 and the timing of the optimization by the optimization unit 17 described later may be determined according to a length of the section that is a target of generation of the supply-demand plan.

The objective function/constraint condition generation unit 16 collects necessary parameters from the storage unit 12, the solar generation power prediction unit 13, the power demand prediction unit 14, and the generator operation time management unit 15 and formulates the mixed integer linear programming problem as an example of the optimization problem.

The optimization unit 17 calculates the supply-demand plan by solving the optimization problem generated by the objective function/constraint condition generation unit 16. The optimization unit 17 may include an optimization solver. When the optimization unit 17 does not obtain a feasible solution in the optimization problem, the optimization unit 17 may transmit display data of error information to the output unit 19. It is noted that, in some aspect, the generated supply-demand plan may be stored once in the storage unit 12.

The evaluation unit 18 performs evaluation related to the supply-demand plan generated by the optimization unit 17. As an example of the evaluation, when the microgrid 2 is operated based on the supply-demand plan optimized by the optimization unit 17, how much the cost is reduced as compared with the case where the operation is not performed based on the supply-demand plan is evaluated. In some configuration, by performing the evaluation in the evaluation unit 18, the content output from the output unit 19 described later to the user of the EMS 3 may be changed. The evaluation by the evaluation unit 18 may be omitted. In some configuration, the EMS 3 may not include the evaluation unit 18, and the supply-demand plan optimized by the optimization unit 17 may be transmitted to the output unit 19 as it is.

The output unit 19 outputs at least a portion of the generated supply-demand plan. The output unit 19 may sequentially output the supply-demand plan after the evaluation by the evaluation unit 18. For example, the output unit 19 outputs information about the operating/stop of the generator of the power generation unit 23 at each time as the supply-demand plan. The output unit 19 displays the information on, for example, a screen included in the EMS 3. The output unit 19 may output the information to the outside of the EMS 3.

The output unit 19 is provided with, for example, a touch panel or the like, and by selecting a power device (for example, a specific generator of the power generation unit 23) in the microgrid 2, the plan related to the operating/stop related to the generator may be displayed. For example, the output unit 19 may display an operating schedule of the power device. The output unit 19 may display a predetermined message to the user of the EMS 3. For example, the output unit 19 may display a guidance message, a warning message, error information, and the like. The output unit 19 may notify the user of predetermined information by e-mail or the like.

About Optimization Problems and the Evaluation Thereof

Next, the optimization problem generated by the objective function/constraint condition generation unit 16 and optimized (solved) by the optimization unit 17 will be described. The objective function/constraint condition generation unit 16 generates the optimization problem (in this embodiment, the mixed integer linear shape) related to the supply-demand plan based on the information acquired by the input unit 11 and the information stored in advance in the storage unit 12. Specifically, the objective function/constraint condition generation unit 16 generates the optimization problem related to the objective function for defining the operation of the power generation unit 23 by using the constraint conditions related to the operations of the RE power generation unit 22, the power generation unit 23, the energy storage unit 25, and the like. The objective function/constraint condition generation unit 16 formulates the objective function and the constraint condition by describing the optimization problem related to the supply-demand plan as the mixed integer linear programming problem. Further, the optimization unit 17 calculates the optimization problem generated by the objective function/constraint condition generation unit 16.

Tables 1 to 3 below list variables required for formulating the objective function and constraint condition as the mixed integer linear programming problem. Table 1 lists the symbols related to a set included in the formula.

TABLE 1

| Symbol | Description |
| --- | --- |
| K | Time of Set (K = {0, 1, . . . , H − 1}) |

Table 2 lists variables (parameters) included in the formula. Table 2 indicates from which (information acquisition source) functional unit illustrated in FIG. 2 the information related to the variable is acquired. The information acquisition source is the "objective function/constraint condition generation unit", which is set by the objective function/constraint condition generation unit 16 based on the input from the user of the EMS 3. Further, the information acquisition source is a "storage battery control unit", which refers to a controller (not illustrated) that controls the energy storage unit 25.

TABLE 2

| Symbol | Value/Unit | Description | Information Acquisition Source |
| --- | --- | --- | --- |
| H | — | Number of Planning Steps in Supply-Demand Plan (Number of Steps which is Target of Plan Generation) | Objective Function/Constraint Condition Generation Unit |
| ΔT | hour | Time Intervals Per One Step (Unit Interval of One Step) | Objective Function/Constraint Condition Generation Unit |
| $T^{on}$ | hour | Minimum Operating Duration Time of Generator | Generator Constraint DB |
| $T^{off}$ | hour | Minimum Stop Duration Time of Generator | Generator Constraint DB |
| $t^{on}$ | — | Minimum Number of Operating Steps of Generator | Objective Function/Constraint Condition Generation Unit |
| $t^{off}$ | — | Minimum Number of Stop Steps of Generator | Objective Function/Constraint Condition Generation Unit |
| $S_0^{on}$ | hour | Operating Duration Time of Generator at Initial Time k = 0 | Operating System Time/Stop System Time Management Unit |
| $S_0^{off}$ | hour | Stop Duration Time of Generator at Initial Time k = 0 | Operating System Time/Stop System Time Management Unit |
| $g^{max}$ | kW | Maximum Generated Power of Generator | Generator Constraint DB |
| $g^{min}$ | kW | Minimum Generated Power of Generator | Generator Constraint DB |

TABLE 2-continued

| Symbol | Value/Unit | Description | Information Acquisition Source |
|---|---|---|---|
| a | kW/(Nm3/h) | Characteristic Parameter of Fuel-Power Generation of Generator (Slope) | Generator Constraint DB |
| b | Nm3/h | Characteristic Parameter of Fuel-Power Generation of Generator (Intercept) | Generator Constraint DB |
| $f_k$ | Nm3/h | Fuel Consumption Amount of Generator at Time k | Objective Function/Constraint Condition Generation Unit |
| $C_k^f$ | Yen/Nm3 | Fuel Unit Price at Time k | Unit Price DB |
| $e^{max}$ | kW | Upper Limit Value of Received Power | External System Constraint DB |
| $e^{min}$ | kW | Lower Limit Value of Received Power | External System Constraint DB |
| $C_k^e$ | yen/Nm3 | Power Purchasing Unit Price at Time k | Unit Price DB |
| $p^{+max}$ | kW | Maximum Charged Power of Storage Battery. Positive Value | Storage Battery Constraint DB |
| $p^{-max}$ | kW | Minimum Charged Power of Storage Battery. Negative Value | Storage Battery Constraint DB |
| $q^{min}$ | kWh | Lower Limit Value of Remaining Charged Power of Storage Battery | Storage Battery Constraint DB |
| $q^{max}$ | kWh | Upper Limit Value of Remaining Charged Power of Storage Battery | Storage Battery Constraint DB |
| $q_k$ | kWh | Remaining Amount of Storage Batter at Time k | Objective Function/Constraint Condition Generation Unit |
| $q_0$ | kWh | Remaining Amount of Storage Batter at Initial Time k = 0 | Storage Battery Control Unit |
| $g_k^{PV}$ | kW | PV Generated Power (Predicted Value) at Time k | PV Generated Power Amount Prediction Unit |
| $d_k$ | kW | Power Demand (Predicted Value) at Time k | Power Demand Prediction Unit |

Table 3 lists variables (decision variables) to be optimized in the objective function generated by the objective function/constraint condition generation unit 16.

TABLE 3

| Symbol | Unit | Description |
|---|---|---|
| $e_k$ | kW | Received Power (+), Transmitted Power (−) at Time k |
| $p_k$ | kW | Charged and Discharged Powers (+Charged, −Discharged) of Storage Battery at Time k |
| $g_k$ | kW | Generated Power of Generator at Time k |
| $z_k$ | — | $z_k =$ 1 Generator Is Operating at Time k; 0 Generator Is Stopped at Time k |

An example of the optimization problem generated by the objective function/constraint condition generation unit 16 by using these variables is represented in the following formula (1).

[Formula 1]
$$\underset{e_k, p_k, K_k, z_k}{\text{minimize}} \sum_{k \in K} \Delta T c_k^e e_k + \Delta T c_k^f f_k \quad (1)$$

In addition, the constraint conditions for solving the above-described optimization problem are the following formulas (2) to (13).

[Formula 2]
$$d_k + p_k = e_k + g_k^{PV} + g_k, k \in K \quad (2)$$

[Formula 3]
$$e^{min} \le e_k \le e^{max}, k \in K \quad (3)$$

[Formula 4]
$$p^{-min} \le p_k \le p^{+min}, k \in K \quad (4)$$

[Formula 5]
$$q^{min} \le q_k \le q^{max}, k \in K \quad (5)$$

[Formula 6]
$$q_{k+1} = q_k + \Delta T p_k, k \in \{0, 1, \ldots, H-2\} \quad (6)$$

[Formula 7]
$$z_k \in \{0, 1\}, k \in K \quad (7)$$

[Formula 8]
$$g^{min} z_k \le g_k \le g^{max} z_k, k \in K \quad (8)$$

[Formula 9]
$$g_k = af_k + b, k \in K \quad (9)$$

[Formula 10]
$$t^{on}(z_k - z_{k-1}) \le \sum_{s=k}^{k+t^{on}-1} z_s, k \in \{1, \ldots, H - t^{on}\} \quad (10)$$

[Formula 11]
$$z_k \ge 1 - \frac{s_0^{on}}{t^{on} - k \Delta r}, k \in \{0, 1, \ldots, t^{on} - 1\} \quad (11)$$

[Formula 12]
$$t^{off}(z_{k-1} - z_k) \le \sum_{s=k}^{k+t^{off}-1} (1 - z_s), k \in \{1, \ldots, H - t^{off}\} \quad (12)$$

[Formula 13]
$$z_k \le \frac{s_0^{off}}{T^{off} - k \Delta T}, k \in \{0, 1, \ldots, t^{off} - 1\} \quad (13)$$

The ton and toff included in the conditions represented in the above-mentioned formulas (2) to (13) are defined as the formulas (14) and (15).

[Formula 14]
$$t^{on} = \left\lfloor \frac{T^{on}}{\Delta T} \right\rfloor \quad (14)$$

[Formula 15]
$$t^{off} = \left\lfloor \frac{T^{off}}{\Delta T} \right\rfloor \quad (15)$$

It is noted that the symbols in the formulas (14) and (15) are follows.

$$\lfloor x \rfloor \quad \text{[Formula 16]}$$

The function defined by the formula (16) is called a floor function and represents the largest integer of x or less.

The formula (1) is an objective function constructed to minimize an economic cost in the microgrid 2, the first term denotes the power purchasing cost, and the second term denotes the fuel cost. That is, the first term in the formula (1) corresponds to the term related to energy transfer from the external energy supply system, and the second term corresponds to the term related to fuel consumption in the microgrid. When the reverse power flow from the microgrid 2 to the external power system 90 is performed, the first term in the formula (1) includes the power purchasing cost.

The formulas (2) to (13) are constraint condition. The formula (2) represents that the supply and demand of power match each other at each time. Further, the formula (3) represents that the received power from the external power system 90 is within the range of the upper limit and the lower limit of the received power. The formula (4) represents that charged and discharged powers of the storage battery are within a predetermined range. The formula (5) represents that the charged and discharged powers of the storage battery of the energy storage unit 25 are operated within predetermined upper and lower limit ranges. The formula (6) illustrates the relational expression between the remaining amount of the storage battery and the charged and discharged powers of the energy storage unit 25. The formula (7) represents that the generator of the power generation unit 23 takes any state of the operating (1) or the stop (0). The formula (8) represents that the generator of the power generation unit 23 is operated within a range of predetermined upper and lower limits of the generated power during operating, and the generated power is substantially zero during stop. The formula (9) represents the relational expression between the generated power of the generator of the power generation unit 23 and the fuel consumption amount.

Figure 5:
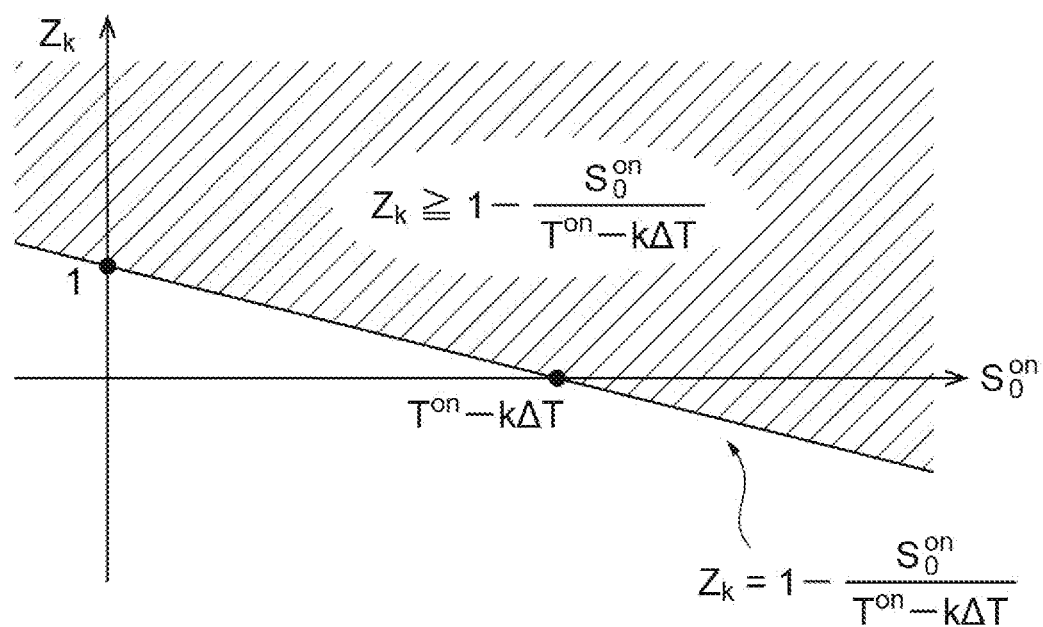
FIG. 5 schematically illustrates a relationship represented in a formula (11).

The formula (10) represents that, once the generator of the power generation unit 23 is started, the generator needs to be continuously operated until the minimum operating duration time elapses (minimum operating time constraint). The formula (11) represents that, when the operating duration time at the planning start time (time that becomes the start point for generating the supply-demand plan) does not reach the minimum operating duration time, the generator of the power generation unit 23 needs to be continuously operated until the minimum operating duration time is reached. It is noted that the relationship represented in the formula (11) is schematically illustrated in FIG. 5. Further, the formula (12) represents that, once the generator of the power generation unit 23 is stopped, the generator of the power generation unit 23 needs to be continuously stopped until the minimum stop duration time elapses (minimum stop time constraint). The formula (13) represents that, when the stop duration time at the planning start time does not reach the minimum stop duration time, the generator of the power generation unit 23 needs to be continuously stopped. In some cases, including the above-mentioned minimum operating time constraint and minimum stop time constraint, it may be referred to as "minimum operation time constraint".

Among the above-described constraint condition, the conditions represented in the formulas (10) to (13) are conditions that limit the operation of the generator of the power generation unit 23 based on the minimum operating duration time (minimum operating duration time and minimum stop duration time). Further, the formulas (11) and (13) are conditions that defines the limitation of the operation based on the operating duration time or the stop duration time at the planning start time (the time that becomes the start point for generating the supply-demand plan). When the planning start time is close to the current time, the information acquired by the generator operation time management unit 15 is used for the operating duration time and the stop duration time. That is, the information based on the actual operation of the generator of the power generation unit 23 up to the current time is used as a portion of the constraint condition.

The optimization unit 17 calculates an optimum solution of variables listed in Table 3 by solving the above-mentioned formulas (1) to (13) generated by the objective function/constraint condition generation unit 16. As a result, the power received (transmitted power) from the external power system 90 at time k, the charged and discharged powers of the storage battery in the energy storage unit 25 at time k, and the generated power of the generator of the power generation unit 23 at time k are obtained, and furthermore, the operating and stop of the power generation unit 23 at time k are specified.

The supply-demand plan optimized by calculation in the optimization unit 17 is output from the output unit 19 after being evaluated by the evaluation unit 18 in some cases.

It is noted that FIG. 3 illustrates the case where there are 16 sections (steps) for performing the optimization calculation in a time-series. In this case, the number of planning steps H listed in Table 2 is H=16. However, the number of planning steps H can be changed in the EMS 3, and H=1 can also be set. When H=1, the description of the constraint condition can be simplified as compared with the case where H is 2 or more. Further, when H=1, the evaluation unit 18 can perform evaluation from the viewpoint different from other conditions.

For example, in some cases, the energy storage unit 25 (storage battery) may not exist in the microgrid 2, or even when it exists, it may not be necessary to consider the remaining amount. As an example, in some cases, when an operator of the storage battery and an operator of the generator are different from each other, since the generator side cannot perform control in consideration of the remaining amount of the storage battery, the number of planning steps H may be calculated as 1. At this time, the minimum operating time constraint represented by the formula (10) and the minimum stop time constraint represented by the formula (12) can be expressed more simply. Specifically, when the number of planning steps H=1, only k=0. Further, at this time, the charged and discharged powers related to the storage battery are acquired from the storage battery controller (storage battery control unit). From the above-mentioned conditions, when H=1, the above-mentioned formulas (6), (9) and (11) disappear, and the formulas (10) and (12) can be described as the following formulas (16) and (17).

[Formula 17]
$$z_0 \geq 1 - \frac{S_0^{on}}{T^{on}}, \quad (16)$$

[Formula 18]
$$Z_0 \leq \frac{S_0^{off}}{T^{off}}, \quad (17)$$

As described above, when the energy storage unit 25 satisfies the predetermined condition or does not exist, the optimization problem can be solved as appropriate even when the number of planning steps H=1.

Herein, when the number of planning steps H=1, it is considered that the content output from the output unit 19 is charged according to the evaluation result by the evaluation unit 18. As described above, in some configurations, a certain message can be output from the output unit 19 to the user of the EMS 3. At this time, for example, as a message output from the output unit 19, the message proposing that the operating state of the generator is changed is issued. In this case, when the operating state of the generator is changed, the evaluation unit 18 may evaluate in advance how much cost improvement effect can be expected, it may be determined whether or not to output the message from the output unit 19 based on the evaluation result, or the content of the message to be output may be changed.

As an example, the evaluation function $F_{now}$ related to the cost represented in the formula (18) is obtained based on the fuel consumption amount of the generator and the received power at the current time.

[Formula 19]
$$F_{now} = \Delta Tc_{now}^e e_{now} + \Delta Tc_{now}^f f_{now} \quad (18)$$

Herein, as represented in the formula (19), the evaluation function $F_{opt}$ related to the cost when the operation of the power generation unit 23 (generator) is changed is obtained based on the optimized result.

[Formula 20]
$$F_{opt} = \Delta Tc_{opt}^e e_{opt} + \Delta Tc_{opt}^f f_{opt} \quad (19)$$

The formulas (18) and (19) are evaluation functions based on the objective function (1). The value obtained by dividing this evaluation function by $\Delta T$ can be regarded as the operating cost [yen/hour] of the microgrid 2 per unit time. Therefore, by dividing the difference between the above-mentioned formulas (18) and (19) by $\Delta T$, how much the cost changes per unit time can be obtained. That is, $(F_{now} - F_{opt})/\Delta T$ [yen/hour] can be referred to as a cost improvement amount per unit time. The EMS 3 may have a configuration that the evaluation unit 18 calculates the cost improvement amount per unit time by using the above-mentioned formulas (18) and (19), and the message to be output from the output unit 19 to the user of the EMS 3 is changed depending on whether or not the cost improvement amount per unit time exceeds the preset threshold value. For example, when the cost improvement amount per unit time exceeds the threshold value, a recommendation screen as illustrated in FIG. 6 is popped up for the user of the EMS 3, and the recommendation notification related to changing the operation of the power generation unit 23 may be performed on the user of the EMS 3 user (operator of the microgrid 2). At this time, the alarm sound may be issued at the same time, or the notification may be transmitted by e-mail. Further, when the cost improvement amount per unit time is the threshold value or less, the recommendation notification may not be performed to the user of the EMS 3, or the behavior when the recommendation notification is performed may be changed.

As described above, by changing the output content from the output unit 19 based on the evaluation result using the evaluation function, the load given to the user of the EMS 3 (the operator of the microgrid 2) can be reduced, or effective recommendation notification can be performed. In many cases, manual operation by the operator of the microgrid 2 actually intervenes in switching the start and stop of the generator of the power generation unit 23. For this reason, there is possibility that, even when the number of times of recommendation is large, the operator may not actually respond to the switching. Further, when the cost improvement width is small compared with the labor cost required for switching the operation of the power generation unit 23, the overall cost may be increased due to the switching of the start/stop of the generator of the power generation unit 23. On the other hand, with a configuration of changing the output content from the output unit 19 based on the evaluation result using the evaluation function, effective recommendation notification can be performed, and the reduction of the cost of the entire system can be efficiently performed.

It is noted that, even when H is 2 or more, the cost may be evaluated by using the same kind of evaluation function as the evaluation function when H=1 described above. That is, even when H is 2 or more, the evaluation may be performed by comparing the cost due to the operating state in the microgrid 2 in the state where a calculation result of the optimization problem (mixed integer linear programming problem in this embodiment) is not applied with the cost when a calculation result of the mixed integer linear programming problem is applied to the microgrid 2. The "cost due to the operating state of the microgrid 2 in the state where the calculation result of the optimization problem (mixed integer linear programming problem)" is applied when H is 2 or more denotes the cost calculated based on the plan value when the calculation result of the latest optimization problem (mixed integer linear programming problem) is not applied and the microgrid 2 is operated based on the previously calculated supply-demand plan. However, when H is 2 or more, since the operation of the energy storage unit 25 and the like are needed to be considered, the description of the evaluation function can be changed from the above-mentioned formulas (18) and (19).

Specifically, the above-mentioned formulas (18) and (19) need to be integrated values at each time step. Further, for the fuel consumption amount and the received power value of the generator after the time k is 1 in the formula (18), the plan value expected at that time needs to be used (the plan value is managed by the user inside the energy management system. The user may change the plan value in response to the recommendation notification). It is noted that the formula (19) is equal to the formula (1) at the end of the optimization calculation. In this manner, by adding the plan value management function in the EMS 3 and comparing the evaluation function based on the plan value with the evaluation function based on the optimization calculation, the cost improvement width evaluation/recommendation notification similar to H=1 can also be performed. However, the cost can be evaluated in the same manner as H=1 by describing the evaluation function by adding the condition of the operation according to the microgrid 2.

It is noted that, in the above-described embodiment, the process of setting one type of optimization problem and performing the optimization is repeated, but the optimization problem can be changed by setting various conditions. Therefore, the optimization problem can be changed according to the operating state of each component of the microgrid 2 and the conditions for operating. Further, in some configurations, in consideration of the constraint condition and the like related to the operating of each component of the microgrid 2, the plurality of types of optimization problems may be set alternately, and the operation of the microgrid 2 may be changed by repeatedly optimizing the optimization problems.

For example, in the microgrid 2 as described in this embodiment, in some cases, the output of the generator constituting the power generation unit 23 can be increased or decreased by automatic control according to a command from the EMS 3, and on the other hand, with respect to the start or stop, the determination and operation of a person (an operator of the microgrid 2) may be required. In such a system, the following two operations may be repeated independently and in parallel. As a repeating method, the repeating cycles may be different from each other so that, for example, the following operation 1 may be set to a 1-minute cycle, and the following operation 2 may be set to a 10-minute cycle.

Operation 1

The above-described optimization problem under the constraint that the start/stop state matches (fixes) the current generator state is to be solved, and the generator output by using the answer is to be controlled. That is, when the current operation of the generator is the operating (1), the optimization problem is solved under the constraint the formula that $Z_0=1$ instead of the formulas (16) and (17). The same applies when the current operation of the generator is stop (0). Among the solutions obtained as the result of solving this optimization problem, the generator output is transmitted to the control device that controls the generator via the EMS 3 to increase or decrease the power of the generator.

Operation 2

Optimization is performed including the start/stop state of the generator. Only when the optimization result is more economical than the current operating state and "the start/stop state $Z_0$ of the generator as the result of solving the optimization problem is different from the operation of the current generator", the optimization result is presented to the user.

A combination of the above-mentioned operations 1 and 2 is particularly useful when the determination and the operation of the user (operator of the microgrid 2) on the start and stop of the power generation unit 23 are needed. That is, the number of times of determination and operation by the user can be reduced as compared with the case where the result of solving the optimization problem is uniformly presented to the user without evaluating whether the result of solving the optimization problem is more economical than the current operating state. Further, even when the optimization problem is solved in a 1-minute cycle, it is practically difficult for the user to start/stop the power generation unit 23 in a 1-minute cycle, so that effective operation is enabled by combining the operations 1 and 2. It is noted that a method of combining the operations 1 and 2 can be changed according to the configuration of the microgrid 2 and the like.

[Energy Management Method]

Figure 7:
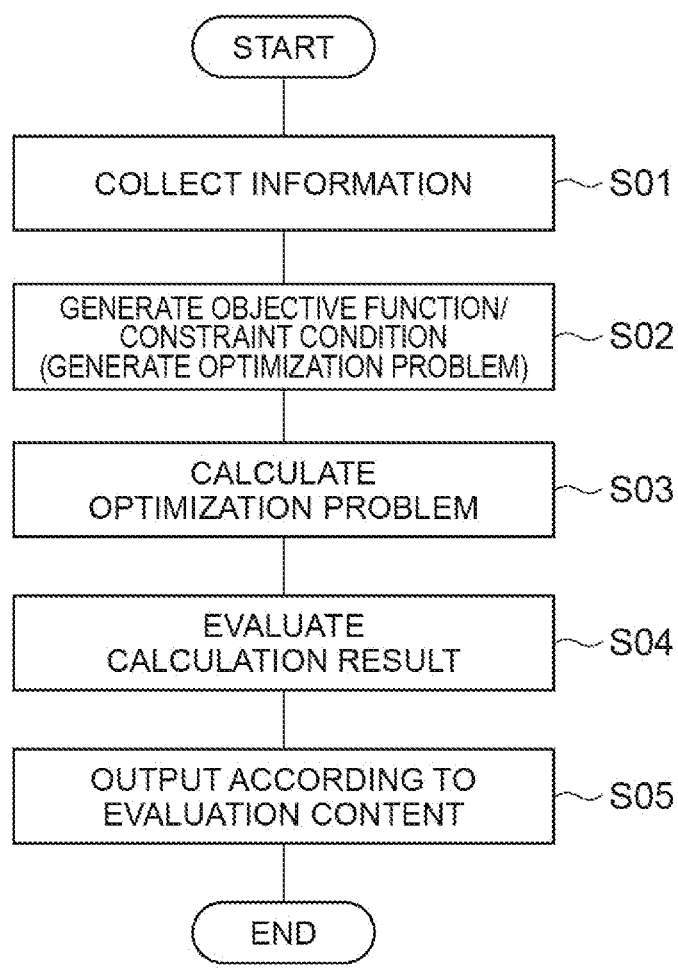
FIG. 7 is a flowchart of processes performed by the energy management system.

Next, an example of a process of the energy management method (demand and supply planning method) executed in the EMS 3 will be described. In this energy management method, a charge/discharge plan of the energy storage unit 25 is optimized in the microgrid 2. FIG. 7 is a flowchart of the process performed by the EMS 3. First, the objective function/constraint condition generation unit 16 of the EMS 3 collects information necessary for generating the objective function/constraint condition used for generating the supply-demand plan (step S01). As described above, the information necessary for generating the objective function/constraint condition is included in the information retained in each component of the EMS 3 or the result calculated in each component. Therefore, the objective function/constraint condition generation unit 16 collects such information.

Next, the objective function/constraint condition generation unit 16 of the EMS 3 generates the objective function/constraint condition based on the collected information (step S02). Next, the optimization unit 17 of the EMS 3 calculates the optimization problem according to the objective function/constraint condition generated by the objective function/constraint condition generation unit 16 (step S03). As a result, the supply-demand plan based on the calculation result can be obtained.

Next, the evaluation unit 18 of the EMS 3 evaluates the calculation result (step S04). As described above, it is not necessary to evaluate the calculation result. In addition, various methods can be used as the evaluation method. When the evaluation is performed, the output unit 19 of the EMS 3 performs output according to the evaluation content (step S05). In the above-mentioned example of the number of planning steps H=1, when $(F_{now}-F_{opt})/\Delta T$ is larger than a predetermined value as a result of the evaluation by using the evaluation function, the recommendation notification is performed, and when the value is equal to or less than a predetermined value, a response such as not performing the recommendation notification is considered. However, in some aspect, this response is an example, and even when the evaluation is performed by the evaluation unit 18, the evaluation result and the supply-demand plan may be output uniformly.

[Hardware Configuration]

Figure 8:
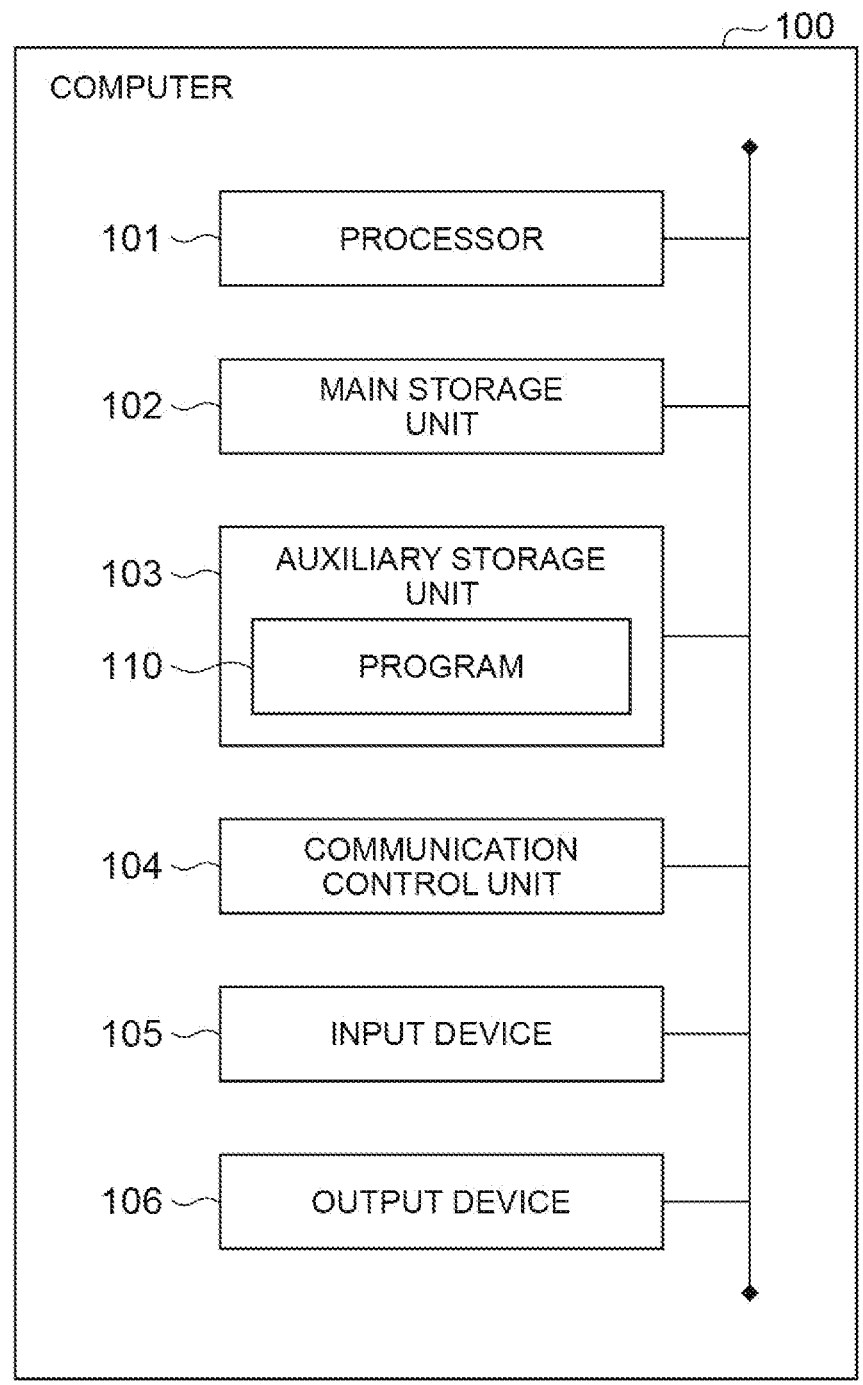
FIG. 8 is a diagram illustrating an example of a hardware configuration of the energy management system.

Next, a hardware configuration of the EMS 3 will be described with reference to FIG. 8. FIG. 8 is a diagram illustrating an example of the hardware configuration of the EMS 3. The EMS 3 includes one or more computers 100. The computer 100 has a central processing unit (CPU) 101, a main storage unit 102, an auxiliary storage unit 103, a communication control unit 104, an input device 105, and an output device 106. The EMS 3 is configured with one or the plurality of computers 100 configured with these hardware and software such as a program.

When the EMS 3 is configured with the plurality of computers 100, these computers 100 may be connected locally or may be connected via a communication network such as the Internet or an intranet. By this connection, one EMS 3 is logically constructed.

The CPU 101 executes an operating system, an application program, and the like. The main storage unit 102 is configured with a read only memory (ROM) and a random access memory (RAM). The auxiliary storage unit 103 is a storage medium configured with a hard disk, a flash memory, or the like. The auxiliary storage unit 103 generally stores a larger amount of data than the main storage unit 102. At least a portion of the storage unit 12 is realized by the auxiliary storage unit 103. The communication control unit 104 is configured with a network card or a wireless communication module. At least a portion of the input unit 11 and the output unit 19 may be realized by the communication control unit 104. The input device 105 includes a keyboard, a mouse, a touch panel, a microphone for voice input, and the like. At least a portion of the input unit 11 is realized by the input device 105. The output device 106 includes a display, a printer, and the like. At least a portion of the output unit 19 is realized by the output device 106. For example, the output device 106 displays the charge/discharge plan or the error information.

The auxiliary storage unit 103 stores a program 110 and data necessary for processes in advance. The program 110 causes the computer 100 to execute each functional element of the EMS 3. In the computer 100, the program 110 executes, for example, the processes related to steps S01 to S05 described above. For example, the program 110 is read by the CPU 101 or the main storage unit 102, and operates at least one of the CPU 101 and is allowed to operate the main storage unit 102, the auxiliary storage unit 103, the communication control unit 104, the input device 105, and the output device 106. For example, the program 110 reads and writes data in the main storage unit 102 and the auxiliary storage unit 103.

The program 110 may be provided after being recorded on a tangible recording medium such as a CD-ROM, a DVD-ROM, or a semiconductor memory. The program 110 may be provided as a data signal via the communication network.

Function

According to the above-mentioned EMS 3 (demand and supply planning apparatus) and demand and supply planning method, the optimization problem (in this embodiment the mixed integer linear programming problem) for the objective function including the terms related to the energy transfer from the external energy supply system (external power system 90) in the microgrid 2 and the terms related to the fuel consumption in the microgrid 2 is generated. At this time, the constraint condition related to the relationship between the information related to the operating duration time in each of the one or more energy generation units (power generation units 23) at the start time for generating the supply-demand plan and the minimum operation time constraint of the energy generation unit is used. Then, the supply-demand plan is output based on the calculation result in the EMS 3. In this manner, by using the constraint condition related to the information related to the operating duration time in each of the one or more energy generation units at the start time for generating the supply-demand plan, the supply-demand plan can be generated as appropriate even when the start time is the current time or is close to the current time.

In the related art, there has been known that the supply-demand plan that defines the start and stop of the power generation unit in the microgrid is generated by calculating the optimization problem described from the economic viewpoint. In recent years, energy generation (power generation) by using renewable energy such as solar power generation is increasingly included in the microgrid. However, renewable energy such as solar power generation are is called variable renewable energy and is difficult to predict accurately. For this reason, it is considered to generate the more accurate supply-demand plan by setting the start time for generating the supply-demand plan to be close to the current time and repeatedly generating the short supply-demand plan. However, with respect to the optimization problem that has been used to generate the supply-demand plan in the related art, it is assumed that a certain time in the future (for example, 1 day to 1 week) from the current time is set to the start time, and furthermore, it is assumed that the energy generation unit is operated based on the supply-demand plan generated in the fast time. For this reason, in the related art, in the problem of optimizing the supply-demand plan that defines the start and stop of the generator, the case where the current time is set to the start point may not be assumed. As a result, if the supply-demand plan starting from the current time by using the optimization problem in the related art intends to be generated, there is a possibility that the optimization problem cannot be solved (no solution).

On the other hand, in the above-described method, the optimization problem is described as a mixed integer linear programming problem, and in addition, the constraint condition related to the relationship between the information related to the operating duration time in each of the one or more energy generation units (power generation units 23) at the start time for generating the supply-demand plan and the minimum operation time constraint of the energy generation unit is used. The optimization problem using the constraint condition considering the operating duration time can be described by including the operating duration time in each of the one or more energy generation units (power generation units 23) at the start time for generating the supply-demand plan in the constraint condition.

Further, in the above-described embodiment, the optimization problem is reduced to a mixed integer linear programming problem. In this manner, by describing the optimization problem as the mixed integer linear programming problem, the time required to solve the optimization problem can be estimated to be short to some extent. As a result, the generation of the supply-demand plan suitable for operation in the microgrid 2 having the RE power generation unit 22 as described above can be performed. The optimization problem with the constraint condition as non-linear with respect to the determinant variables can be described, but in this case, it is considered that, since the metaheuristic optimization method is adopted, the optimality is not guaranteed. In addition, it is difficult to estimate the calculation time in the case of solving a nonlinear optimization problem, and the using is difficult in the case of repeatedly generating the supply-demand plan in a short time as described above. On the other hand, by reducing the optimization problem to the mixed integer linear programming problem, it becomes possible to repeatedly generate the supply-demand plan, and thus, more flexible operation becomes possible.

Further, in some aspect, the start time for generating the supply-demand plan may be the current time or may be set to a time period when the unit time elapses once from the current time. That is, the current time or the period from the current time to the elapse of the time $\Delta T$ is set as the start time for generating the supply-demand plan. In this case, it is necessary to calculate the optimization problem in consideration of the operating duration time of the energy generation unit. On the other hand, with the above-described configuration, the supply-demand plan can be generated as appropriate even when the start time is the current time or is close to the current time. In actual operation, for example, it is assumed that the start time for generating the supply-demand plan is 01:00. On the other hand, if it is assumed that the calculation time required for calculating the above-described optimization problem is 1 minute, when the calculation is started from 01:00, the time at which the calculation result is obtained becomes 01:01, and thus, the start time has passed. In such a case, for example, by starting the process related to generation of the supply-demand plan so that the calculation of the optimization problem is started at 00:59, the supply-demand plan can be generated under the condition of being closer to the start time. It is noted that, as described above, by setting the start point time to be a "time period when the unit time elapses once from the current time", the constraint condition used for the optimization problem can be according to the actual state of the start time.

It is noted that the remaining amount of the energy storage unit 25 may change according to a change in time. For this reason, when the start time is not the current time, there remains the problem of how to set the remaining amount of the energy storage unit 25 at the start time k=0 in the optimization problem. However, since the fluctuation of the remaining amount of the energy storage unit 25 is negligible between the case where the start time of the supply-demand plan is the current time and a time period when the unit time elapses once from the current time, even when the start time is not exactly the current time, the remaining amount of the storage battery at the start time k=0 may be used as the remaining amount of the storage battery at the current time acquired from the control unit of the storage battery.

Further, the above-described EMS 3 further includes the evaluating of the calculation result of the optimization problem (in the above-described embodiment, the mixed integer linear programming problem) in the evaluation unit 18, and the outputting of the supply-demand plan by the output unit 19 includes changing of the output content according to the result of the evaluating.

With such a configuration, for example, when the supply-demand plan based on the calculation result is effective in improving the cost in the microgrid, the purport can be presented to the user, and on the other hand, even when the supply-demand plan based on the calculation result is not sufficiently effective in improving the cost in the microgrid, the purport can be presented to the user. And, more detailed information according to the calculation result can be output.

Further, more specifically, the evaluation unit 18 may evaluate the difference between the cost due to the operating state in the current microgrid 2 in the state where the calculation result of the optimization problem (in the above-described embodiment, the mixed integer linear programming problem) is not applied and the cost when the calculation result of the optimization problem is applied to the microgrid. Then, the output unit 19 may output the information related to the cost that can be reduced when the calculation result of the optimization problem is applied to the microgrid 2 when the difference is larger than the threshold value. With such a configuration, since the more specific information can be presented to the user, the user can flexibly respond to the adoption or rejection of the generated supply-demand plan. In particular, since work costs of labor costs and the like occur accordingly, the switching (switching between operating and stop) of the operation of the energy generation unit (power generation unit 23) becomes useful information when the user determines whether to perform the work based on the generated supply-demand plan.

Further, in the EMS 3, the generator operation time management unit 15 acquires the information related to the operating duration time of one or more energy generation units up to the current time. Then, with respect to the optimization problem, the constraint condition based on the information related to the acquired operating duration time of one or more energy generation units is used. With such a configuration, the more appropriate supply-demand plan can be generated based on the operating duration time of the energy generation unit. Further, when the EMS 3 is configured to manage the generator operation time management unit 15, the information related to the operating duration time up to the current time can be acquired in real time, so that the case where the supply-demand plan is repeatedly generated at shorter intervals also useful.

Modified Example

As described above, the present disclosure is not necessarily limited to the above-described embodiment, and various changes can be made without departing from the spirit of the present embodiment.

For example, in the above-described embodiment, the supply-demand plan for power in the microgrid 2 is described as an example. However, in some configuration, target energy may be different from power. For example, the above-described configuration can also be applied to supply and demand for steam. In this case, for example, the power generation unit 23 (generator) described in the above-mentioned microgrid 2 is replaced with a boiler. Furthermore, the above-described configuration can be applied to supply-demand plans with both power and steam considered. In this case, a plant device included in the microgrid 2 may include a cogeneration system such as a gas engine or a gas turbine in addition to the generator and the boiler. Even when an electric heat supply-demand plan considering both power and steam is taken into consideration, similarly to the configuration described in the above-described embodiment, the mixed integer linear programming problem considering the operating duration time of the energy generation unit can be generated and calculated by setting the objective function and the constraint condition. As described above, the configuration described in the above-described embodiment is not limited to the star and/stop of the power generation unit 23 (generator), but can be applied to a boiler, a cogeneration system, a fuel cell, and the like. In the case of a fuel cell, the configuration described in the above-described embodiment can be applied by replacing the fuel consumed in the above-mentioned microgrid 2 with hydrogen.

The objective function and constraint condition described above are examples and can be changed according to the configuration of each component in the microgrid 2. Further, the optimization problem is not limited to the mixed integer linear programming problem and may be generated by using other optimization methods such as a convex programming problem and a dynamic planning method.

For example, the energy storage unit 25 included in the microgrid 2 described in the above-described embodiment may be omitted. In this case, the optimization problem (mixed integer linear programming problem) is generated by deleting the constraint condition related to the energy storage unit 25. Further, the RE power generation unit 22 included in the microgrid 2 described in the above-described embodiment may be omitted. In this case, the optimization problem (mixed integer linear programming problem) is generated by deleting the constraint condition related to the RE power generation unit 22.

Further, there may be the reverse power flow to the external power system 90. In this case, generally, the power transmitted to the external power system 90 is included in the evaluation function (objective function) as a power transmission reward.

Further, in the above-described embodiment, the case where the EMS 3 aims to supply power to the power load unit 24 at low cost has been described. For this reason, as the objective function (1), the formula focusing on the cost generated at the time of supplying power has been used. On the other hand, the objective function may be set for the purpose of reducing a $CO_2$ emission amount in the microgrid 2. In this case, the objective function (1) becomes an evaluation function related to the $CO_2$ emission amount. Specifically, $C_k^e$ is a $CO_2$ emission factor [ton-$CO_2$/kWh] related to the power purchasing, and $C_k^f$ is a $CO_2$ emission factor [ton-$CO_2$/(Nm$^3$)] related to the fuel consumption. In addition, besides the cost and the $CO_2$ emission amount, a used amount of the crude oil equivalent energy can be considered to be minimized. As described above, the method for generating the optimization problem described in the above-described embodiment is an example and can be changed as appropriate. In addition, the constraint conditions can be changed according to the configuration of the microgrid 2.

For example, in the supply-demand plan output from the output unit 19, instead of using the microgrid 2 for operation, for example, the calculated supply-demand plan may be used for spot transactions on the Japan Electric Power Exchange.

The energy storage unit 25 may include a plurality of storage batteries. In this case, the constraint condition that defines the relationship between the plurality of storage batteries such as a constraint condition that the storage battery to be charged and the storage battery to be discharged are allowed to overlap in time may be added.

The storage unit 12 of the EMS 3 may be provided on a cloud server. The storage unit 12 may be synchronized with the cloud server.

Others

This technology contributes to Goal 13 "Take emergency measures to mitigate climate change and its impacts" of sustainable development goals (SDGs) led by the United Nations in order to contribute to promotion of carbon-free power supply and stabilization of power balance after introduction of variable renewable energy such as solar power generation.

REFERENCE SIGNS LIST

1: power supply system, 2: microgrid, 3: energy management system, 11: input unit, 12: storage unit, 13: solar generation power prediction unit, 14: power demand prediction unit, 15: generator operation time management unit, 16: objective function/constraint condition generation unit, 17: optimization unit, 18: evaluation unit, 19: output unit, 21: management unit, 22: RE power generation unit, 23: power generation unit, 24: power load unit, 25: energy storage unit, 26: received power measurement unit, 27: transmission power measurement unit, 90: external power system, 100: computer, 110: program.

The invention claimed is:

1. A method of controlling a microgrid having one or more fuel-powered generators generating energy, an energy storage device, and a load device to consume the energy, the method comprising:
    acquiring an optimization problem based on an energy transfer between an external energy supply system and the microgrid and further based on a fuel consumption in the microgrid;
    acquiring a constraint condition that is based on a relationship between an operating duration time in each of the one or more fuel-powered generators at a start time for generating a supply-demand plan and a minimum operation time constraint of the fuel-powered generators;
    obtaining a calculation result by calculating the optimization problem to which the constraint condition has been applied;
    generating the supply-demand plan based on the calculation result of the optimization problem; and
    controlling an operation of the one or more fuel-powered generators based on the supply-demand plan.

2. The method of controlling a microgrid according to claim 1, wherein the optimization problem is reduced to a mixed integer linear programming problem.

3. The method of controlling the microgrid according to claim 1, wherein the start time for generating the supply-demand plan is the current time or is set to a time period when a unit time elapses once from the current time once.

4. The method of controlling the microgrid according to claim 1, further comprising:
    evaluating the calculation result of the optimization problem,
    outputting on a display screen, an output content of the supply-demand plan that is based on a result of the evaluating.

5. The method of controlling the microgrid according to claim 4,
    wherein the evaluating is evaluating a difference between a cost due to an operating state in the microgrid in a state where the calculation result of the optimization problem is not applied and a cost when the calculation result of the optimization problem is applied to the microgrid, and
    wherein, in the outputting of the supply-demand plan, information related to the cost that can be reduced when the calculation result of the optimization problem is applied to the microgrid when the difference is larger than a threshold value is output.

6. The method of controlling the microgrid according to claim 1, further comprising acquiring information related to the operating duration time of the one or more fuel-powered generators,
    wherein the calculation result is obtained by further applying to the optimization problem, a constraint condition based on the acquired information related to the operating duration time of the one or more fuel-powered generators.

7. A control apparatus for a microgrid having one or more fuel-powered generators generating energy, an energy storage device, and a load device to consume the energy, the control apparatus comprising:
    a processor configured to:
        acquire an optimization problem based on an energy transfer between an external energy supply system and the microgrid and further based on a fuel consumption in the microgrid;

acquire a constraint condition that is based on a relationship between an operating duration time in each of the one or more fuel-powered generators at a start time for generating a supply-demand plan and a minimum operation time constraint of the fuel-powered generators;

obtain a calculation result by calculating the optimization problem to which the constraint condition has been applied;

generate the supply-demand plan based on the calculation result of the optimization problem; and send a command output to the microgrid, to control an operation of the one or more fuel-powered generators based on the supply-demand plan.

8. The control apparatus according to claim 7, wherein the processor is further configured to:

wherein the supply-demand plan includes a planned operation state of the fuel-powered generators at future timings during a predetermined time period, wherein the command output is configured to cause the fuel-powered generator to be selectively operated or stopped from operating, at the future timings, according to the planned operation state of the supply-demand plan.

9. An energy grid system comprising:

a microgrid that is connected to an external energy supply system, wherein the microgrid includes a fuel-powered generator to generate a supply of energy within the microgrid, and an energy management device configured to control the fuel-powered generator; and a processor configured to:

acquire a first energy unit value of an external energy available in the external energy supply system, wherein the first energy unit value varies over time;

acquire a second energy unit value of a fuel to be consumed by the fuel-powered generator, wherein the second energy unit value varies over time;

acquire an energy demand that is predicted to occur in the microgrid, at future timings within a time period;

acquire an objective function that represents a summation of:

a first term value corresponding to the first energy unit value multiplied by an amount of the external energy to be supplied to the microgrid, at the future timings; and a second term value corresponding to the second energy unit value multiplied by an amount of the fuel to be consumed by the fuel-powered generator, at the future timings;

optimize the objective function by setting the amount of the external energy to be supplied to the microgrid and the amount of the fuel to be consumed by the fuel-powered generator based on a comparison of the first energy unit value with the second energy unit value, at each of the future timings, to satisfy the energy demand that is predicted in the microgrid at the future timings, and to minimize the summation of the first term value and the second term value during the time period, wherein the amount of fuel to be consumed by the fuel-powered generator is further set for each of the future timings, based on a constraint condition that includes a minimum duration during which the fuel-powered generator is constrained to continue operating after starting to operate;

generate a supply-demand plan including a planned operation state of the fuel-powered generator based on the amount of the fuel set in the optimized objective function, at each of the future timings; and send a command output to the energy management device of the microgrid, to selectively control the fuel-powered generator to operate or stop operating, at the future timings, according to the planned operation state of the supply-demand plan.

10. The energy grid system according to claim 9, wherein the microgrid further includes a renewable-energy generator, and wherein the processor is further configured to:

acquire a predicted operation state of the renewable-energy generator at the future timings; and calculate an energy supply predicted to be generated by the renewable-energy generator based on the predicted operation state of the renewable-energy generator, wherein the amount of the external energy associated with the first term value of the objective function and the amount of the fuel associated with the second term value of the objective function, are further set based on the energy supply predicted to be generated by the renewable-energy generator, at each of the future timings.

11. The energy grid system according to claim 9, wherein the microgrid further includes an energy storage device configured to store the energy received from the fuel-powered generator and to release the stored energy, in response to the energy management device, wherein the amount of the external energy associated with the first term value of the objective function and the amount of the fuel associated with the second term value of the objective function, are further set based on a level of stored energy available in the energy storage device at each of the future timings, wherein the level of stored energy is constrained to remain within a predetermined range during the time period, and wherein the supply-demand plan further includes a planned operation state of the energy storage device at each of the future timings, to selectively control the energy storage device via the energy management device.

12. The energy grid system according to claim 11, wherein the processor is further configured to:

acquire an amount of energy predicted to be consumed from the microgrid by a load device; and calculate the energy demand to occur in the microgrid, at each of the future timings, based on the amount of energy predicted to be consumed by the load device.

* * * * *